(12) United States Patent
Chui

(10) Patent No.: US 6,411,305 B1
(45) Date of Patent: Jun. 25, 2002

(54) IMAGE MAGNIFICATION AND SELECTIVE IMAGE SHARPENING SYSTEM AND METHOD

(75) Inventor: Charles K. Chui, Menlo Park, CA (US)

(73) Assignee: Picsurf, Inc., Mountain View, CA (US)

( * ) Notice: Subject to any disclaimer, the term of this patent is extended or adjusted under 35 U.S.C. 154(b) by 0 days.

(21) Appl. No.: 09/307,548

(22) Filed: May 7, 1999

(51) Int. Cl.$^7$ ................................................ G09G 5/00
(52) U.S. Cl. ..................... 345/660; 345/671; 345/668; 345/669; 345/661; 345/667
(58) Field of Search ................................. 345/660, 671, 345/668, 669, 667, 661

(56) References Cited

U.S. PATENT DOCUMENTS

| | | | | |
|---|---|---|---|---|
| 5,467,439 A | * | 11/1995 | Lee et al. | 395/133 |
| 5,867,606 A | * | 2/1999 | Tretter | 382/261 |
| 6,011,531 A | * | 1/2000 | Mei et al. | 345/92 |
| 6,078,307 A | * | 6/2000 | Daly | 345/132 |
| 6,215,916 B1 | * | 4/2001 | Acharya | 382/298 |
| 6,226,414 B1 | * | 5/2001 | Go | 382/240 |
| 6,229,520 B1 | * | 5/2001 | Clatanoff et al. | 345/132 |

\* cited by examiner

*Primary Examiner*—Matthew Luu
*Assistant Examiner*—Daniel J Chung
(74) *Attorney, Agent, or Firm*—Pennie & Edmonds LLP

(57) ABSTRACT

An initial magnified image is generated using a lowpass magnification filter. The resulting image will generally have smaller image data gradients than the original image. Portions of the image that the user, or an application, want to sharpen are selected, and the corresponding portions of the original image data are highpass filtered by one or more highpass filters to generate sharpening data. The initial magnified image data and the sharpening data are combined to generate a sharpened magnified image. In a preferred embodiment, two highpass filters are used, and a distinct sharpening parameter is used to scale the coefficients in each of the two highpass filters. The sharpening parameters are user selectable. This gives the user greater control over the image sharpening process than use of a single highpass filter.

42 Claims, 12 Drawing Sheets

$f_{k,l} = \Sigma_{i,j} \, P_{k-2i,l-2j} \, d_{i,j}$

Highpass Center Midpoint Pixel Filling Filter

Sum of Lowpass and Highpass Filters

IMAGE MAGNIFICATION AND SELECTIVE IMAGE SHARPENING SYSTEM AND METHOD

The present invention relates generally to systems and methods for magnifying a digitally encoded image, and particularly to a system and method for magnifying an image while selectively sharpening some or all of the magnified image.

BACKGROUND OF THE INVENTION

Referring to FIG. 1, when an image such as a computer screen image is magnified, such as by a factor of four (i.e., the width and height of the image are each doubled), a number of technical issues must be resolved in order to produce a satisfactory result. First, there is the basic issue that many pixels in the magnified image will initially have no assigned value, and therefore the values (e.g., color, or gray scale values) for those pixels will have to be generated from the original pixel information. For a magnification factor of four, three-fourths of the pixels in the magnified image will initially have no value. More generally, the number of pixels that initially have no value will depend on the magnification factor. The process of generating color values for these pixels is usually called interpolation.

There are literally hundreds of articles and patents addressing interpolation techniques for handling image data magnification and related problems. Some interpolation techniques are optimized for speed of operation, while others for optimized to preserve a particular characteristic of the original image, such as first or second or even third order gradients.

The present invention introduces a new tool: a user moveable and tuneable screen image magnifying glass, implemented in computer software. The position of the magnifying glass is determined by the user, for instance using a mouse or track ball pointing device. In some implementations the user may also control the size of the magnifying window. More importantly, the user has easy access to one or more control parameters that control the sharpness of the magnified image.

One of the most frequent complaints heard concerning magnified digital images is that they are fuzzy—that is, that the magnified image is not as sharp as the original image. Stated in technical terms, this means that color gradients in the magnified image are shallower than in the original image. During the development of previous image magnification tools, the inventors have noticed that the methodologies for generating sharp magnified images vary, depending on the type of image being magnified. For instance, when magnifying text, simple pixel replication generates relatively sharp magnified images of acceptable quality. However, simple pixel replication is totally unacceptable for magnifying photographs and other images with "continuously" varying colors and shading because pixel replication, while preserving sharp edges in the image, converts gradual color and brightness changes into user visible step functions, sometimes called "blocky artifacts."

U.S. patent application Ser. No. 09/232,174, file Jan. 15, 1999, entitled "Image Data Interpolation System and Method," introduced a number of new techniques for magnifying photographs and other images with "continuously" varying colors and shading, while preserving both gradual color and intensity gradients and sharp edges in the image. U.S. patent application Ser. No. 09/232,174, is hereby incorporated by reference as background information. The present invention uses and extends those techniques by introducing adjustable highpass filters for sharpening magnified images.

SUMMARY OF THE INVENTION

In summary, the present invention is an image magnifying method and apparatus.

An initial magnified image is generated using a lowpass magnification filter. The resulting image will generally have smaller image data gradients than the original image. Portions of the image that the user, or an application, want to sharpen are selected, and the corresponding portions of the original image data are highpass filtered by one or more highpass filters to generate sharpening data. The initial magnified image data and the sharpening data are combined to generate a sharpened magnified image.

In a preferred embodiment, two highpass filters are used, and a distinct sharpening parameter is used to scale the coefficients in each of the two highpass filters. The sharpening parameters are user selectable. This gives the user greater control over the image sharpening process than use of a single highpass filter.

BRIEF DESCRIPTION OF THE DRAWINGS

Additional objects and features of the invention will be more readily apparent from the following detailed description and appended claims when taken in conjunction with the drawings, in which:

DESCRIPTION OF THE PREFERRED EMBODIMENTS

Figure 2:
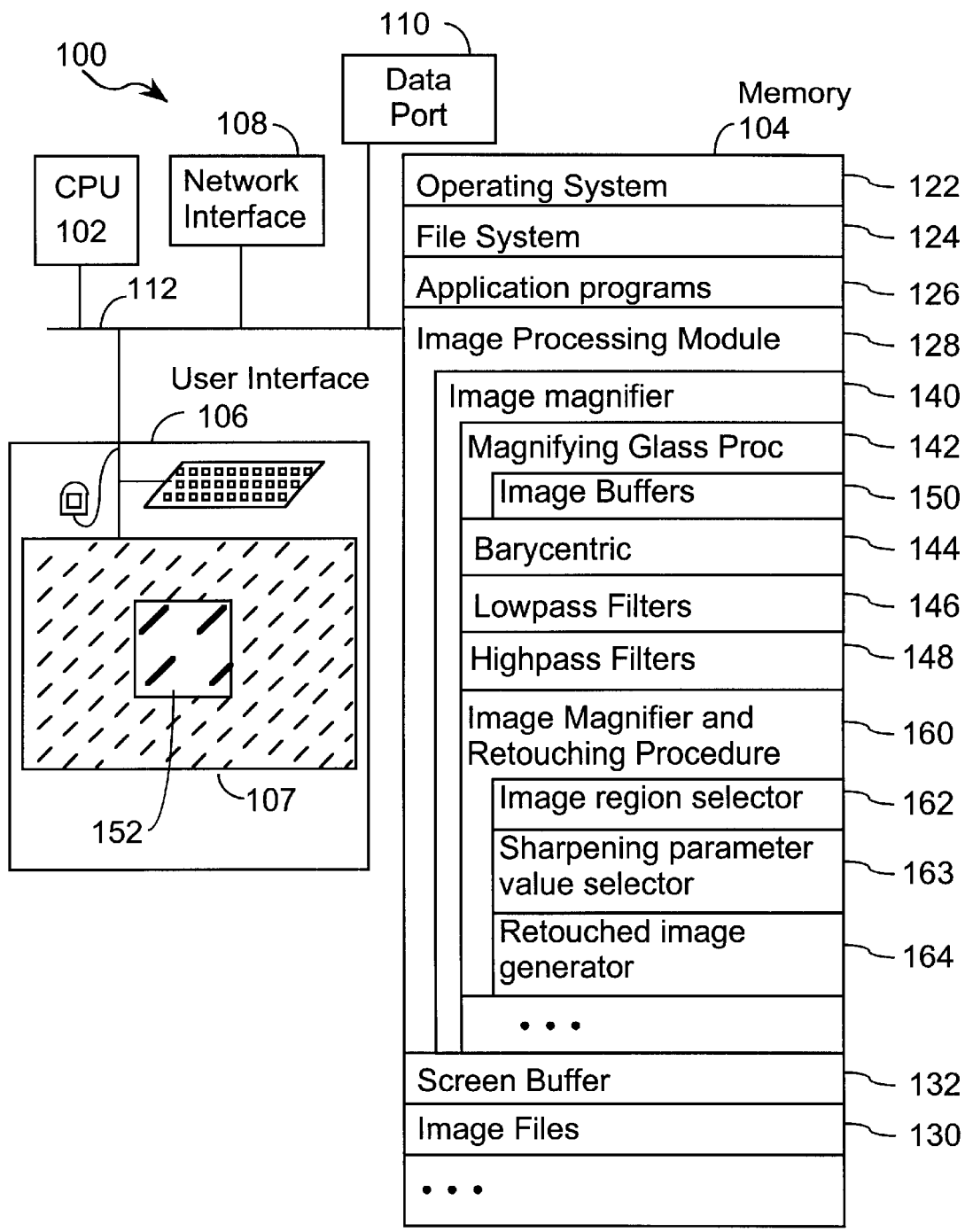
FIG. 2 is a block diagram of a general-purpose computer incorporating an embodiment of the present invention.

Referring to FIG. 2, the present invention may also be implemented using a programmed general-purpose computer system 100. The computer system 100 may include:

one or more data processing units (CPU's) 102, memory 104, which will typically include both high speed random access memory as well as non-volatile memory;

a user interface 106, including a display device 107 such as a CRT or LCD type display;

a network or other communication interface 108 for communicating with other computers as well as other devices;

a data port 110, such as for sending and receiving images to and from a digital camera (although such image transfers might also be accomplished via the network interface 108); and one or more communication busses 112 for interconnecting the CPU(s) 102, memory 104, user interface 106, network interface 108 and data port 110.

The computer system's memory 104 stores procedures and data, typically including: an operating system 122 for providing basic system services;

a file system 124, which may be part of the operating system;

application programs 126, such as user level programs for viewing and manipulating images, an image processing module 128, for performing various image processing functions including those that are the subject of the present document;

image files 130 representing various images; and a screen buffer 132, which stores an image currently being displayed on the display device 107.

The image processing module 128 may include an image magnifier module 140, and the image magnifier module 140 may include:

a magnifying glass procedure 142, for magnifying a user specified portion of a computer screen image;

a set of buffers 150 for storing image data used by the magnifying glass procedure 142;

a Barycentric interpolator procedure 144 for generating interpolated image data;

lowpass filters 146 for generating interpolated image data; and highpass filters 148 for generating interpolated image data.

The image processing module 128 may also include an image magnifier and retouching procedure 160, and the image magnifier and retouching procedure 160 may include:

an image region selector 162 for selection regions of a magnified image to be sharpened;

a sharpening parameter value selector 163, for selecting a sharpening parameter value; and a retouched image generator 164 for combining an initial magnified image with sharpening data to generate a retouched, selectively sharpened, magnified image.

The image processing module 128 may include many other procedures and data structures not directly relevant to the portions of the module discussed in this document.

Screen Image Magnification

Figure 1:
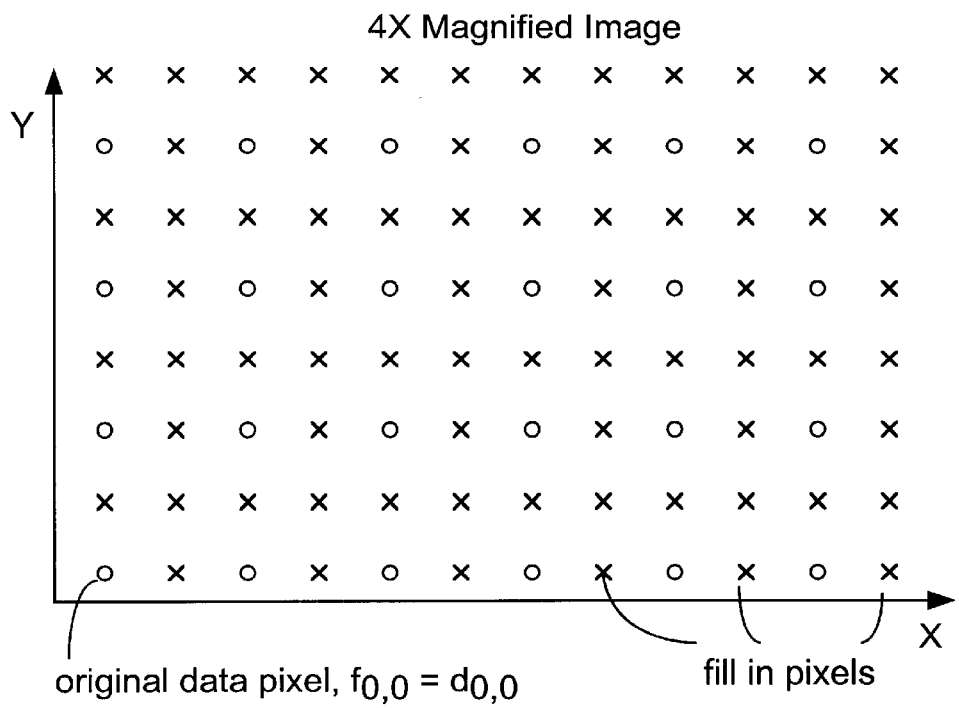
FIG. 1 depicts an array of pixels in a magnified image.
Figure 3:
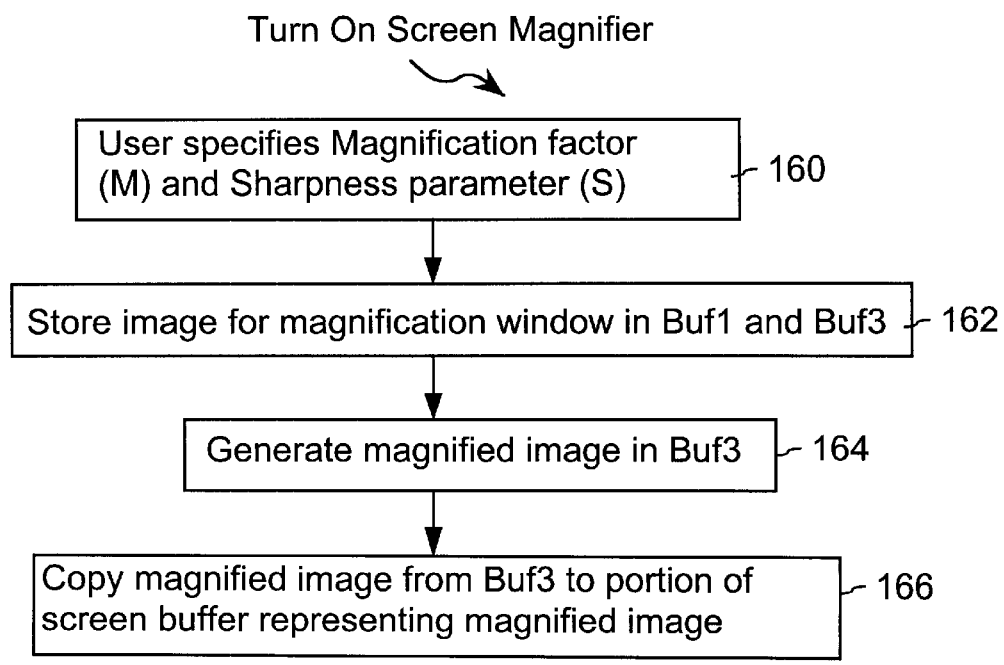
FIG. 3 is a flow chart of a procedure for magnifying a portion of a screen image.
Figure 4:
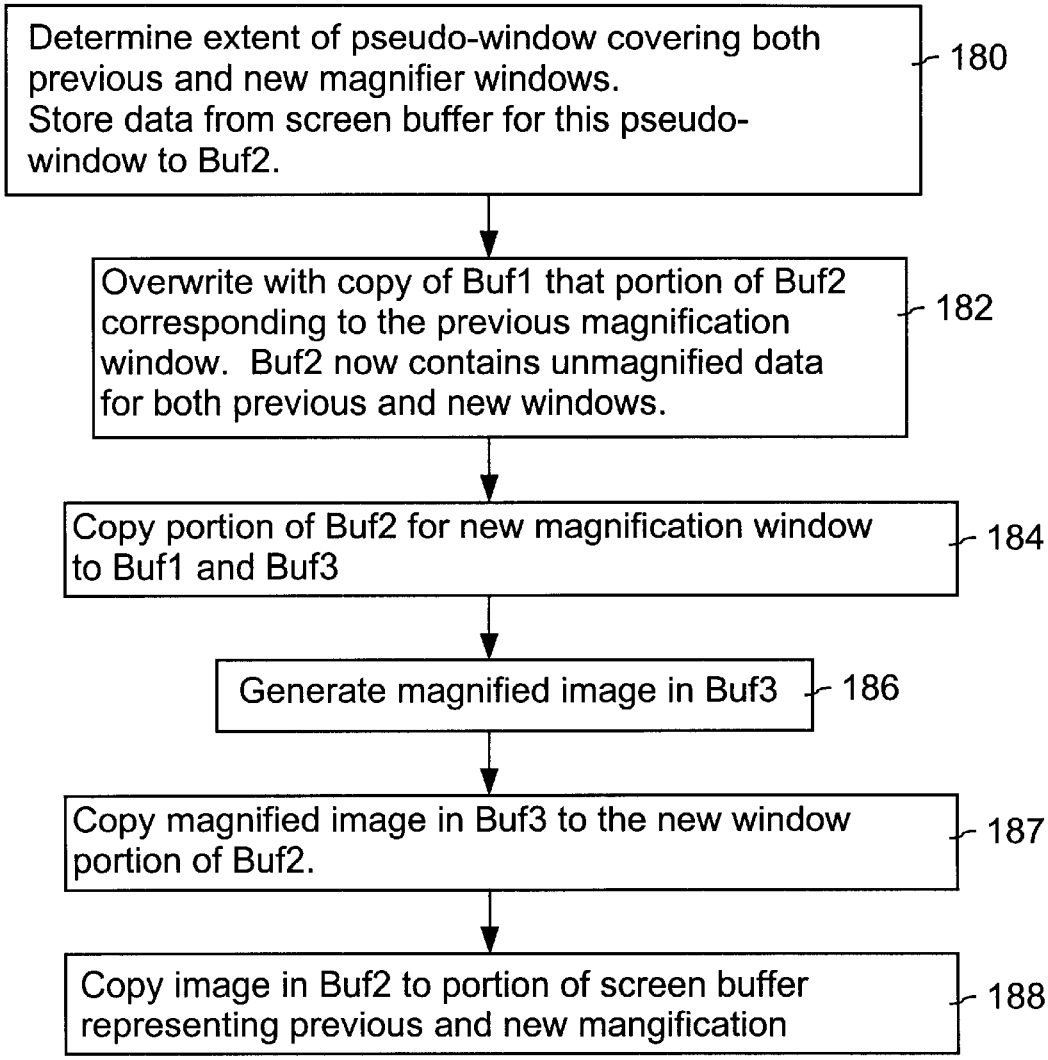
FIG. 4 is a flow chart of a procedure for magnifying a portion of a screen image while moving the magnification window such that a new magnification window overlaps the previous magnification window.
Figure 5:
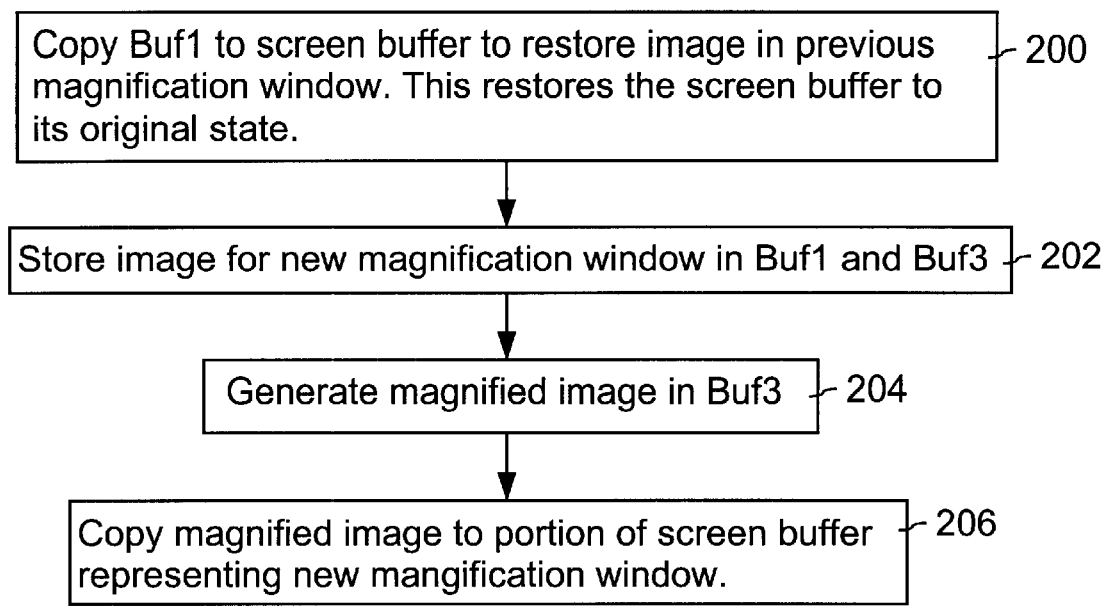
FIG. 5 is a flow chart of a procedure for magnifying a portion of a screen image while: moving the magnification window such that a new magnification window does not overlap the previous magnification window.

Referring to FIGS. 3, 4 and 5, the display 107 is shown with a portion of the screen image magnified. There are many reasons that a user might want to magnify a portion of a screen image. The present invention provides a "magnifying glass" procedure 142 (FIG. 2) that enables the user to move a virtual magnifying glass over any portion of the image currently on the display 107. The procedure generates a magnified image within a magnification window 152 (FIG. 2) whose position is determined by the screen cursor position.

The magnifying glass procedure uses three image buffers 150:

Buf1 is used to store a copy of the image data replaced by magnified data in the screen image buffer.

Buf2 is used to store image data from the screen buffer for two overlapping windows when the magnification window is being moved by the user.

Buf3 is used to generate and store data representing a magnified image.

When the magnifying glass procedure begins execution, the user may specify the magnification factor, M, to be used and also a sharpness parameter, S. These parameters are assigned default values, for example the previous values selected by the user, if the user does not specifically select them. In a preferred embodiment, the magnifying glass procedure allows the user to select from a short list of magnification factors, such as 2, 3 and 4 (representing the amount by which the image is magnified in each dimension), and to select sharpness parameter values from another short list, such as 0, 0.1 0.25, 0.5, 0.75, 0.9 and 1.0. The meaning of the sharpness parameter S is explained below.

The position of the cursor on the screen indicates the portion of the screen to be magnified. In some implementations the user can also specify the size of the magnification window (sometimes called the zoom window), while in other implementations the size of the magnification window is fixed (e.g., at a size of 160×160 pixels).

The procedure copies from the screen buffer the unmagnified image data occupying the magnification window into Buf1 and Buf3 (162). The copy in Buf1 will be used later to restore the screen image, while the copy in Buf3 is used to create a magnified image (164) using a predefined image magnification procedure. The magnified image is generated in and stored in Buf3. Suitable image magnification procedures are discussed in more detail below. However, the screen image magnification aspect of the present invention can be used with a wide variety of image magnification methods, including image magnification methods not discussed in this document.

Once the magnified image has been generated, it is copied from Buf3 to the portion of the screen buffer corresponding to the magnification window (166).

Whenever the user changes any of the control parameters of the magnification procedure, such as the window size, magnification factor or sharpness parameter, the screen buffer contents are restored from Buf1, and then the procedure shown in FIG. 3 is executed to generate a magnified image in accordance with the newly selected control parameters.

Referring to FIG. 4, when the user moves the screen cursor, for instance using a mouse or trackball pointer device, the portion of the screen image that is magnified changes, just as though the user has moved a real magnifying glass over the screen. The procedure monitors the screen cursor position and "updates" the magnification window whenever the screen cursor position changes by at least k pixels in any direction, where k is usually set equal to one or two. If the screen cursor is moved continuously, the magnifying window will be typically updated at the same rate as the refresh rate of the display device (e.g., 60 times per second).

If the user moves the cursor reasonably slowly, such that the new magnification window overlaps the previous magnification window, then the magnification window update procedure shown in FIG. 4 is executed. The procedure begins by determining the extent of a rectangular "pseudo-window" covering both the previous and new magnification windows. The image data in the screen buffer for this pseudo-window is copied to Buf2 (180). Thus, at this point Buf2 contains some magnified image data and some unmagnified image data.

Next, the portion of Buf2 containing magnified data is overwritten with the image data in Buf1 (182). Buf2 now contains unmagnified data for both the previous and new magnification windows. Image data for the new magnification window is then copied from Buf2 to Buf1 and Buf3 (184). The image data in Buf3 (or Buf1) is used to generate a magnified image in Buf3 (186), which is then copied into the portion of Buf2 corresponding to the new magnification window (187). Finally, Buf2 is copied to the portion of the screen buffer corresponding to the rectangle covering both the previous and new magnification windows (188).

By constructing the new partially magnified image in the Buf2 buffer and then copying Buf2 to the screen buffer, the procedure for moving the magnification window avoid generating "image flashing" artifacts. That is, using Buf2 enables the magnified window to move smoothly across the screen.

If the user moves the cursor quickly, such that the new magnification window does not overlap the previous magnification window, then the magnification window update procedure shown in FIG. 5 is executed. The procedure begins by copying the contents of Buf1 to the screen buffer so as to restore the unmagnified image in the previous magnification window (200). This restores the screen buffer to its original state. Then, the procedure copies from the screen buffer the unmagnified image data occupying the new magnification window into Buf1 and Buf3 (202). The image data copy in Buf3 (or Buf1) is used to create a magnified image in Buf3 (204) using a predefined image magnification procedure. Once the magnified image has been generated, it is copied from Buf3 to the portion of the screen buffer corresponding to the new magnification window (206).

Image Magnification with Sharpness Adjustment Variable

Figure 6A:
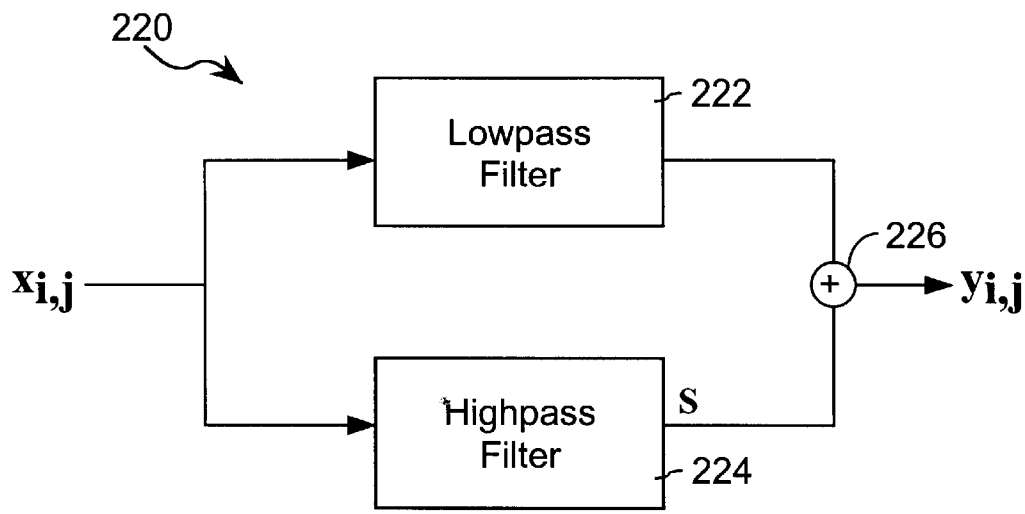
FIG. 6A is a block diagram of a magnifying filter with variable image sharpness control.

FIG. 6A shows an image magnification filter 200 that includes a lowpass image interpolation filter 222, as well as a highpass interpolation filter 224. A typical lowpass filter computes an average, or weighted average of pixels near the "fill-in" pixel whose value is being computed. A typical highpass filter computes the difference between pixels near the "fill-in" pixel whose value is being computed. Thus, the output of lowpass filter 222 corresponds to lower spatial frequency components of the enlarged image data, while the output of the highpass filter 224 corresponds to higher spatial frequency components of the enlarged image data, with the "dividing" point between the spatial frequency ranges of the lowpass and highpass filters typically being equal to approximately three quarters of the spatial frequency of the pixels in the magnified image.

For example, if the lowpass and highpass filters are the lowpass and highpass filters used for wavelet reconstruction (e.g., the Haar wavelet filters shown in FIG. 6D), the magnifying filter is the same as a wavelet synthesis filter, with the exception that the magnifying filter uses one or more adjustable sharpness parameters.

In a preferred embodiment, the coefficients of the highpass filter 224 are scaled by the sharpness parameter S. As a result, the output of the highpass filter 224 is effectively multiplied (or scaled) by a sharpness parameter S before it is combined with the output of the lowpass filter 222 by adder 226, although the scaling actually occurs during the filtering process. When S is set to zero (S=0), the filter 220 is a linear interpolation filter, which results in blurring of the magnified image, but preserves color gradients. When S is set to 1 (S=1), the filter 220 is a pixel replication filter, which produces sharp but blocky images. S=1 is a good setting for magnifying text, but poor for magnifying photographs and other graphic images. A good setting for magnifying photographs and other graphic images will depend somewhat on the particular image being magnified, but a value of S between 0.25 and 0.50 is suitable for many such images, representing a compromise between sharpness and blocky artifacts.

Figure 6B:
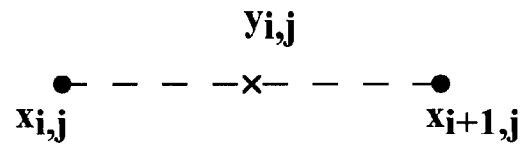
FIGS. 6B and 6C depict two pixel midpoint interpolation situations encountered when magnifying an image by a factor of four.
Figure 6C:
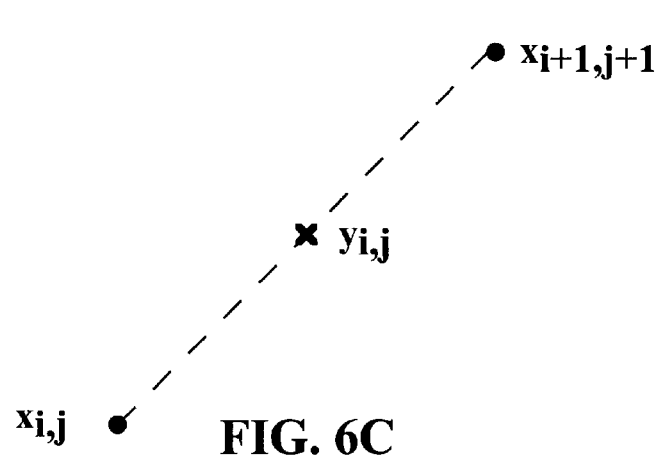
Figure 6D:
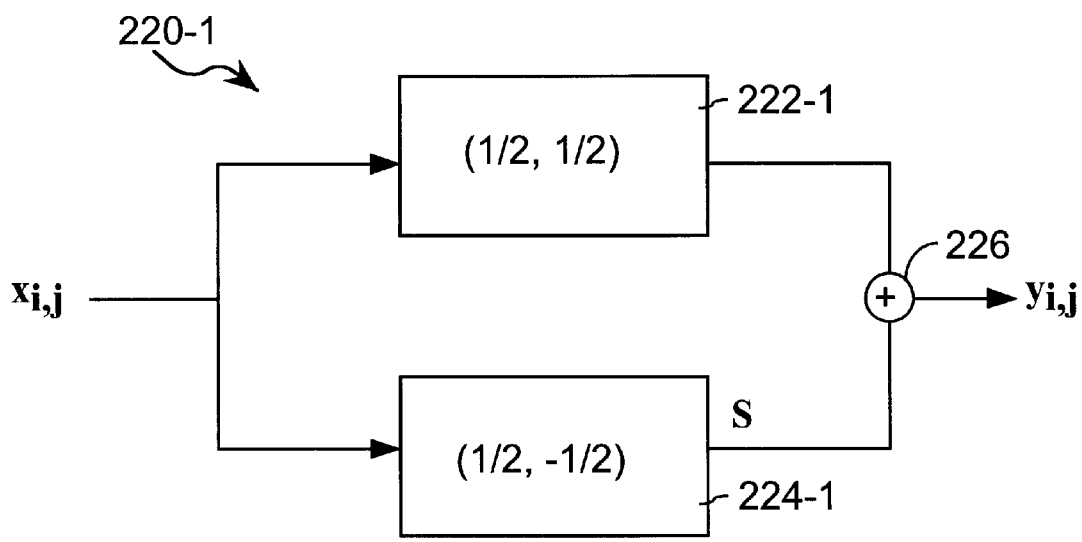
FIG. 6D is a block diagram of a magnifying filter, with variable image sharpness control, for magnifying an image by a factor of four (i.e., by a factor of two in each of the horizontal and vertical directions).

FIG. 6B shows a fill-in pixel $y_{i,j}$ located between two pixels $x_{i,j}$ and $x_{i+1,j}$ that have the same y coordinate value, and which already have image data values. FIG. 6C shows a similar pixel fill-in situation, except that the fill-in pixel $y_{i,j}$ is located between two pixels $x_{i,j}$ and $x_{i+1,j+1}$ that have different x and y coordinate values. FIG. 6D shows an example of an image magnification filter 220-1, in particular, one in which the lowpass filter 222-1 simply averages the image data of the two pixels closest to the fill-in pixel, and the highpass filter 224-1 computes half the difference of the two pixels closest to the fill-in pixel.

For the image magnification situation represented by FIG. 6B, a mathematical representation of the lowpass filter 222-1 of FIG. 6D is $$y_i = \frac{1}{2}x_i + \frac{1}{2}x_{i+1}$$

and a representation of the complete magnification filter 220-1 is $$y_i = \left(\frac{1}{2}x_i + \frac{1}{2}x_{i+1}\right) + S\left(\frac{1}{2}x_i - \frac{1}{2}x_{i+1}\right).$$

For the image magnification situation represented by FIG. 6C, a mathematical representation of the magnification filter 222-1 of FIG. 6D is $$y_{i,j} = \left(\frac{1}{2}x_{i,j} + \frac{1}{2}x_{i+1,j+1}\right) + S\left(\frac{1}{2}x_{i,j} - \frac{1}{2}x_{i+1,j+1}\right).$$

Figure 6E:
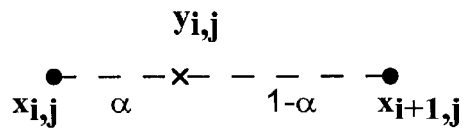
FIG. 6E depicts a pixel interpolation situation encountered when magnifying an image by a factor that may or may not be equal to four.
Figure 6F:
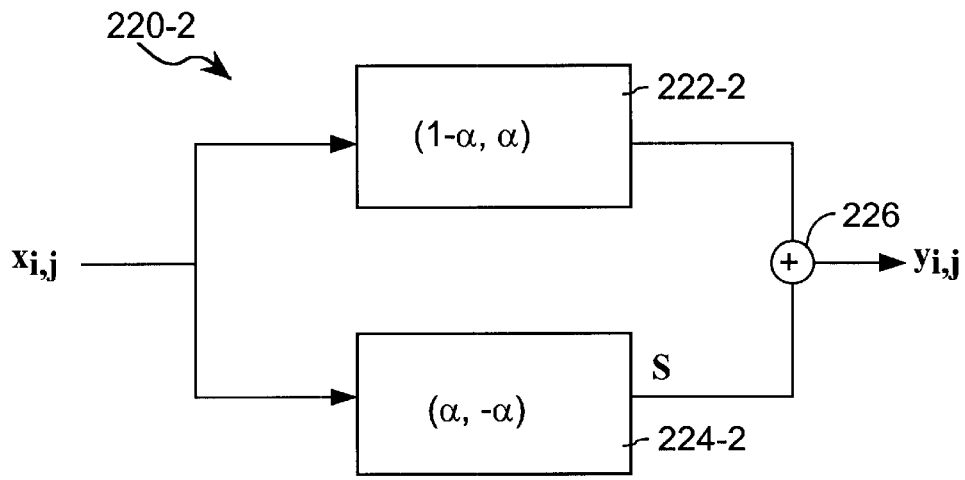
FIG. 6F is a block diagram of a magnifying filter, with variable image sharpness control, for magnifying an image by a factor that may or may not be equal four.

Referring to FIG. 6E, when an image is magnified by a factor other than 4, 9, 16 or the like (i.e., by an integer in each dimension), there is a need to compute the value of fill-in pixels at fractional positions (i.e, at points other than the midpoint between two pixels having assigned image data values). FIG. 6F shows a magnification filter 220-2 having a linear lowpass and highpass filters 222-2 and 224-2, respectively. A mathematical representation of the magnification filter 220-2 is $$y_{i,j}=((1-\alpha)x_{i,j}+\alpha x_{i+1,j+1})+S\alpha(x_{i,j}-x_{i+1,j+1}).$$

Magnification Using Barycentric Interpolation

In Barycentric interpolation, interpolation computations are performed using the Barycentric, rather than the Cartesian, coordinate system. The Barycentric coordinate system specifies the location of a pixel in terms of the coordinates (u,v,w), where u, v and w specify the location of the pixel relative to three neighboring pixels locations A, B, C, having pixel values a, b and c, respectively. The pixels locations A, B and C form the vertices of a triangle enclosing the new pixel location (u,v,w). The pixel value of this new pixel location is ua+vb+wc. Coordinates u, v and w indicate the relative position of the new pixel to the A, B and C pixel locations, respectively, and furthermore u+v+w=1.

Barycentric interpolation is, in effect, a two dimensional linear interpolation that produces planar triangular surfaces. An advantage of using Barycentric coordinates is that interpolation computations are based on the relative locations of adjacent pixels, whereas computations based on the Cartesian coordinate system typically require reference to absolute pixel locations.

Barycentric magnification starts by remapping original pixels to new positions in accordance with a specified magnification factor. Then image data values are computed at each of the pixel positions in the resulting pixel array. For pixel positions that are horizontally or vertically colinear with remapped pixel values, simple linear interpolation is used. Pixel positions that are not horizontally or vertically colinear with remapped pixel values are assigned values using the Barycentric interpolation formula:

$$x=ua+vb+wc$$

where u+v+w=1 and pixel values a, b and c represent the three pixels closest to the pixel position for which an interpolated value is being generated. The three closest pixels will, in general, form a triangle with the "selected" pixel (i.e., the one for which an interpolated pixel value is being generated) falling in the interior of the triangle. In this particular case, u=v=w=⅓. More generally, at other magnifications, (u,v,w) are generated in accordance with the equations:

$$u = \frac{(x_2 y_3 - x_3 y_2) + (x_3 y - x y_3) + (x y_2 - x_2 y)}{(x_2 y_3 - x_3 y_2) + (x_3 y_1 - x_1 y_3) + (x_1 y_2 - x_2 y_1)}$$

$$v = \frac{(x y_3 - x_3 y) + (x_3 y_1 - x_1 y_3) + (x_1 y - x y_1)}{(x_2 y_3 - x_3 y_2) + (x_3 y_1 - x_1 y_3) + (x_1 y_2 - x_2 y_1)}$$

$$w = \frac{(x_2 y - x y_2) + (x y_1 - x_1 y) + (x_1 y_2 - x_2 y_1)}{(x_2 y_3 - x_3 y_2) + (x_3 y_1 - x_1 y_3) + (x_1 y_2 - x_2 y_1)}$$

where $(x_1,y_1)$, $(x_2,y_2)$ and $(x_3,y_3)$ are the locations of the three pixels whose position and values define the plane (in three dimensional space) on which the location (x,y) is supposed to be located. It is noted that the denominators of the equations for u, v and w are identical, and that the numerators are linear with respect to both x and y.

Figure 6G:
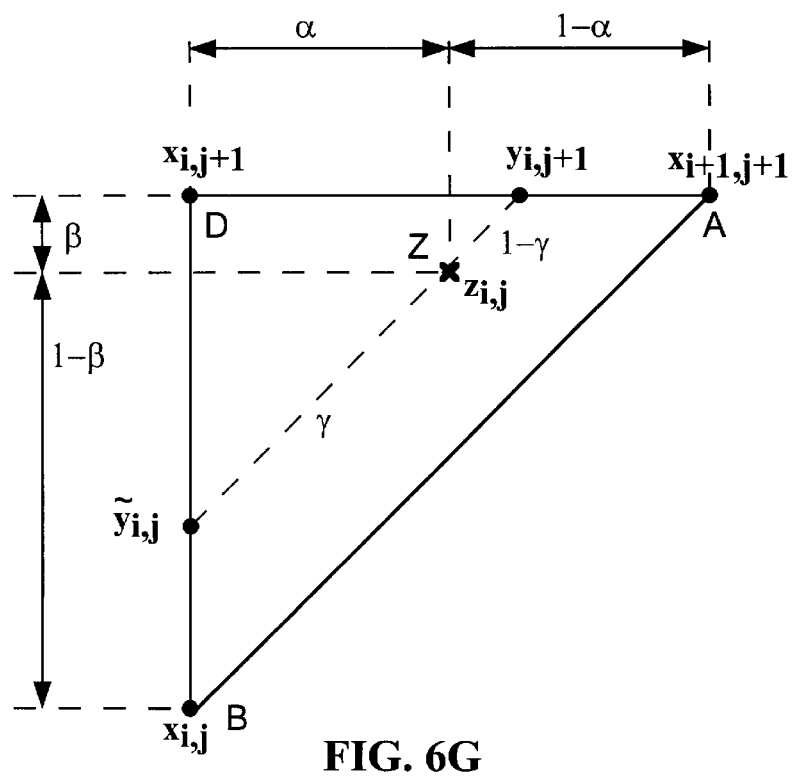
FIGS. 6G and 6H depict relationships between initial pixel data points and interpolated data points when using the Bary centric image magnification methodology of the present invention.

Referring to FIG. 6G, an image data value $z_{i,j}$ for a pixel that is not at the same horizontal or vertical position as any of the remapped pixels (e.g., pixels A, B and D) is generated by computing interpolated pixel values $y_{i,j+1}$ and $\tilde{y}_{i+1,j}$ at positions having the same horizontal and vertical positions, respectively, as the remapped pixels, as shown. Then, the image data value $z_{i,j}$ is computed from pixel values $y_{i,j+1}$ and $\tilde{y}_{i+1,j}$. In each case, the interpolated values are computed using a combination of lowpass and highpass filtering, as represented by FIG. 6F. More specifically, for the pixel interpolation situation shown in FIG. 6G, a mathematical representation of the magnification filter 220-2 is $$z_{i,j}=((1-\gamma)\tilde{y}_{i,j}+\gamma y_{i,j+1})+S\gamma(\tilde{y}_{i,j}-y_{i,j+1})$$

where $$y_{i,j+1}=[(1-\alpha-\beta)x_{i,j+1}+(\alpha+\beta)x_{i+1,j+1}]+S(\alpha+\beta)[x_{i,j+1}-x_{i+1,j+1}], \text{ and}$$

$$\tilde{y}_{i,j}=[(\alpha+\beta)x_{i,j}+(1-\alpha-\beta)x_{i,j+1}]+S(1-\alpha-\beta)[x_{i,j}-x_{i,j+1}].$$

Figure 6H:
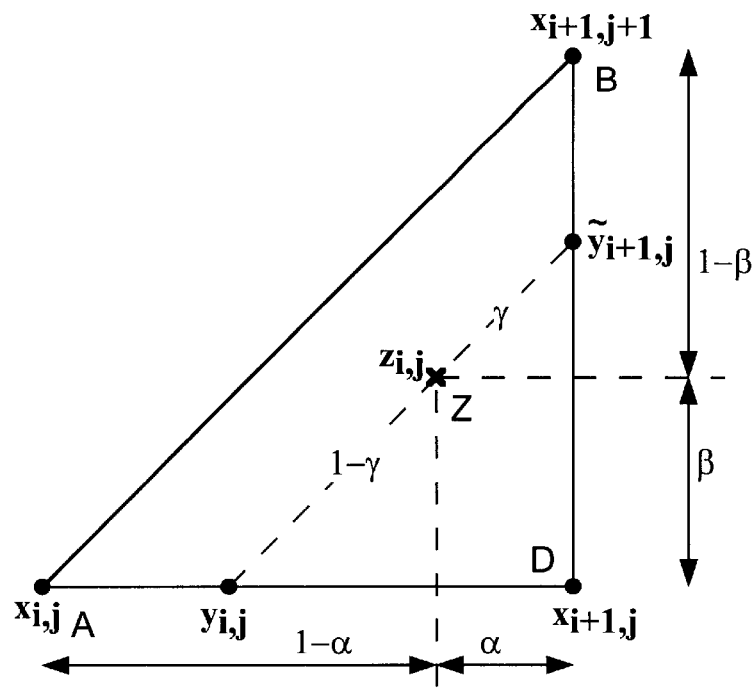

The interpolation situation shown in FIG. 6H is similar to that of FIG. 6G, except that the remapped pixels (e.g., pixels A, B and D) have a different orientation with respect to the pixel Z for which an interpolated value is to be generated. For this example, a mathematical representation of the magnification filter 220-2 is $$z_{i,j}=(\gamma y_{i,j}+(1-\gamma)\tilde{y}_{i+1,j})+S(1-\gamma)(y_{i,j}-\tilde{y}_{i+1,j})$$

where $$y_{i,j}=[(\alpha+\beta)x_{i,j}+(1-\alpha-\beta)x_{i+1,j}]+S(1-\alpha-\beta)[x_{i,j}-x_{i+1,j}], \text{ and}$$

$$\tilde{y}_{i+1,j}=[(1-\alpha-\beta)x_{i+1,j}+(\alpha+\beta)x_{i+1,j+1}]+S(\alpha+\beta)[x_{i+1,j}-x_{i+1,j+1}].$$

Magnification Using Bilinear Interpolation

Figure 7A:
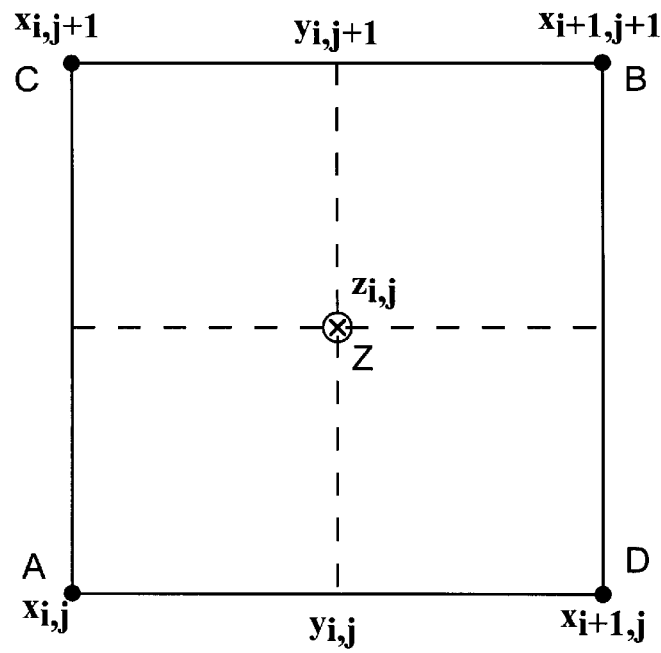
FIG. 7A depicts relationships between initial pixel data points and interpolated data points when using bi-linear image magnification and the interpolated data point is at a midpoint between four initial pixel data points.

Referring to FIG. 7A, there is shown a pixel Z that is located in the middle of four remapped pixels A, B, C and D. Using a bilinear interpolation version of the magnification filter 220 (FIG. 6A), a mathematical representation of the interpolation filter is $$z_{i,j} = \frac{1}{4}\{(1+S)^2 x_{i,j} + (1-S^2)(x_{i,j+1} + x_{i+1,j}) + (1-S)^2 x_{i+1,j+1}\}.$$

Note that when S is set to zero (S=0), this the same as a bilinear interpolation.

Figure 7B:
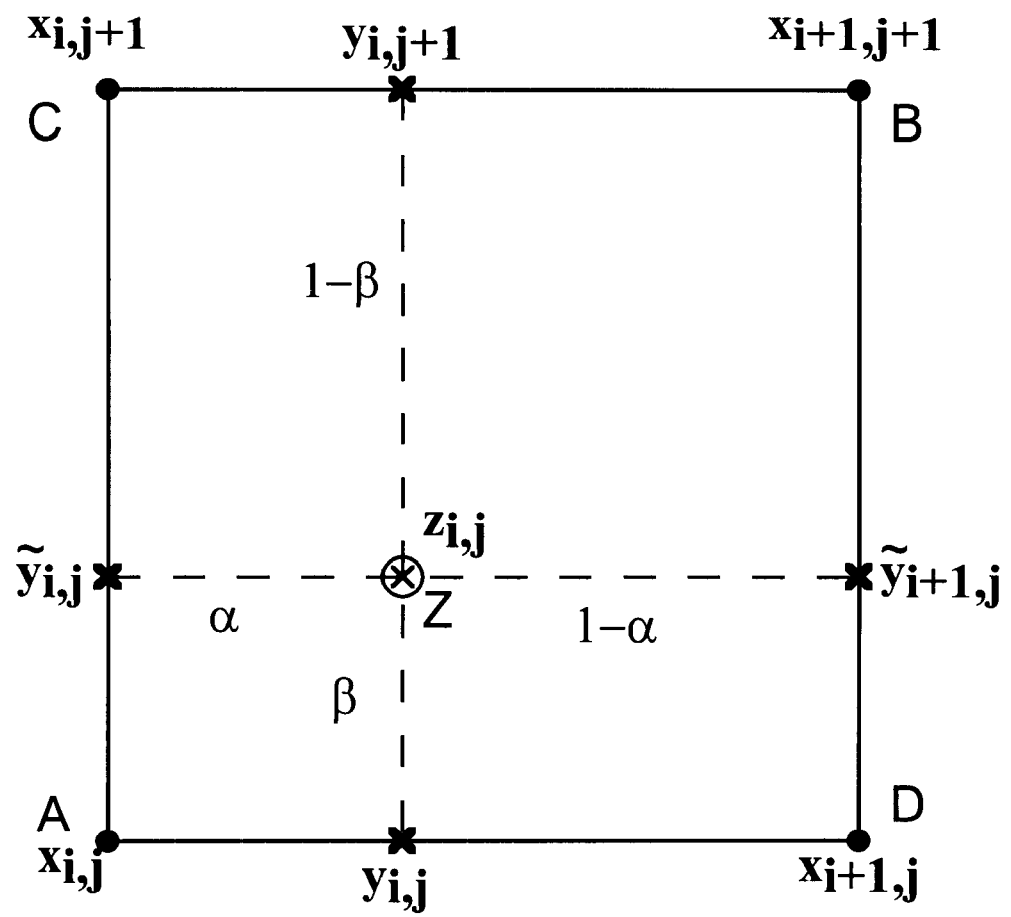
FIG. 7B depicts relationships between initial pixel data points and bi-linear interpolated data points when the interpolated data point is not at a midpoint between four initial pixel data points.

Referring to FIG. 7B, when the fill-in pixel Z is located at a position other than the middle of the four closest neighboring remapped pixels, a mathematical representation of the interpolation filter 220 is as follows. First, the filter is applied to generate image data values for $y_{i,j}$ and $y_{i,j+1}$, as follows:

$$y_{i,j}=[(1-\alpha)x_{i,j}+\alpha x_{i+1,j}]+S\alpha[x_{i,j}-x_{i+1,j}]$$

$$y_{i,j+1}=[(1-\alpha)x_{i,j+1}+\alpha x_{i+1,j+1}]+S\alpha[x_{i,j+1}-x_{i+1,j+1}]$$

where $0 \leq \alpha \leq 1$. Then those values are used to generate an image data value $z_{i,j}$ for pixel Z:

$$z_{i,j} = [(1-\beta)y_{i,j} + \beta y_{i,j+1}] + S\beta[y_{i,j} - y_{i,j+1}]$$

$$= (1+S\beta-\beta)y_{i,j} + \beta(1-S)y_{i,j+1}$$

$$= (1+S\beta-\beta)(1+S\alpha-\alpha)x_{i,j} + \alpha(1+S\beta-\beta)(1-S)x_{i+1,j} +$$

$$\beta(1-S)(1+\alpha S-\alpha)x_{i,j+1} + \alpha\beta(1-S)^2 x_{i+1,j+1}$$

where $0 \leq \beta \leq 1$.

Alternately, $z_{i,j}$ is computed by first computing values for $\tilde{y}_{i,j}$ and $\tilde{y}_{i+1,j}$ using the interpolation filter 220, and then applying the filter 220 to generate $z_{i,j}$ as follows:

$$z_{i,j} = [(1-\alpha)\tilde{y}_{i,j} + \alpha\tilde{y}_{i+1,j}] + S\alpha[\tilde{y}_{i,j} - \tilde{y}_{i+1,j}]$$
$$= (1+S\alpha-\alpha)\tilde{y}_{i,j} + \alpha(1-S)\tilde{y}_{i+1,j}$$
$$= (1+S\beta-\beta)(1+S\alpha-\alpha)x_{i,j} + \alpha(1+S\beta-\beta)(1-S)x_{i+1,j} +$$
$$\beta(1-S)(1+\alpha S-\alpha)x_{i,j+1} + \alpha\beta(1-S)^2 x_{i+1,j+1}$$

Both approaches give the same result for $z_{i,j}$. When $\alpha$ and $\beta$ are both equal to 0.5, the interpolation filter 220 is the same as the bilinear interpolation version of the filter, discussed above with reference to FIG. 7A.

Figure 8A:
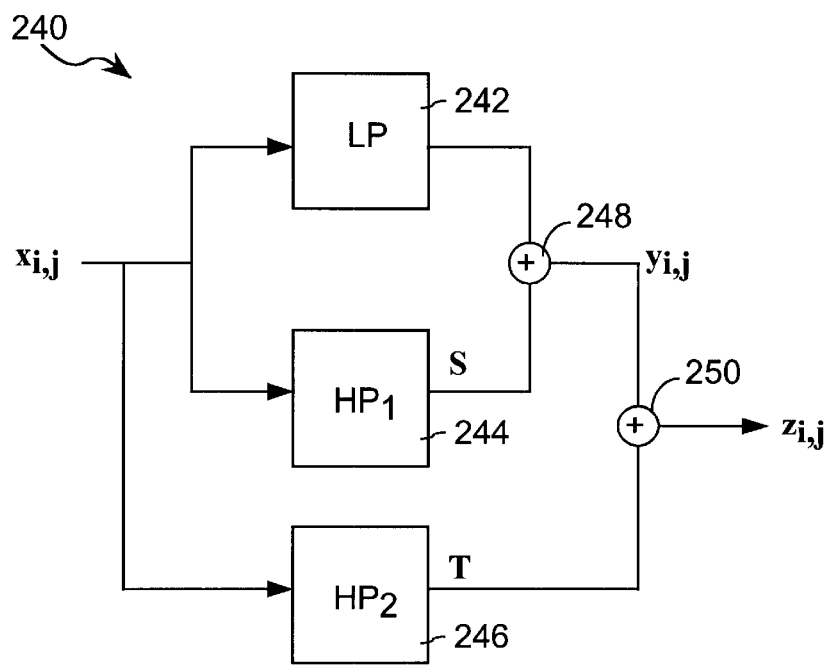
FIGS. 8A and 8B are block diagrams of alternate implementations of an image magnifying filter.
Figure 8B:
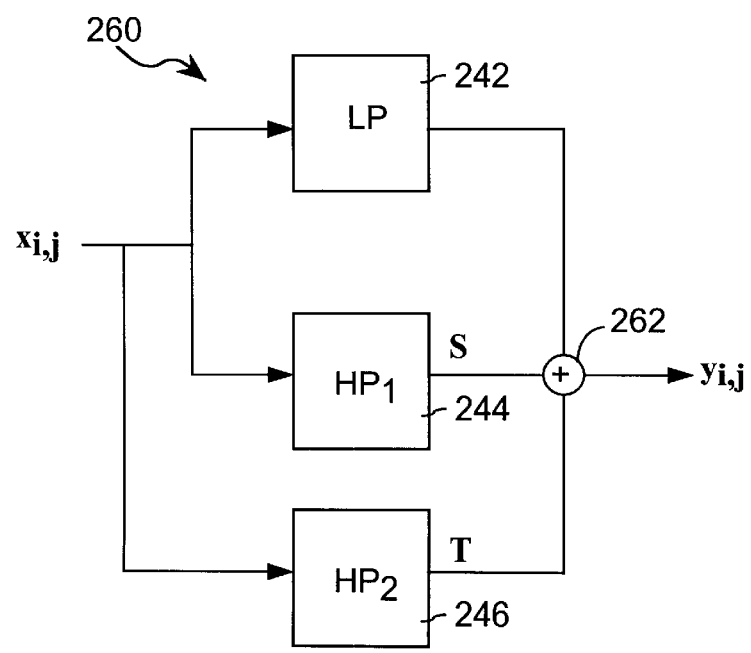

Referring to FIGS. 8A and 8B, the magnification process can be further fine tuned, and the resulting image sharpened by using a magnification filter 240 or 260 that has two highpass filters 244, 246 that are used in conjunction with a lowpass filter 242. Each of the highpass filters 244, 246 has an associated sharpening parameter (S for filter 242, and T for filter 244). In one preferred embodiment, the lowpass filter 242 is wavelet like pixel filling filter 280, shown in block diagram form in FIG. 9.

Figure 9:
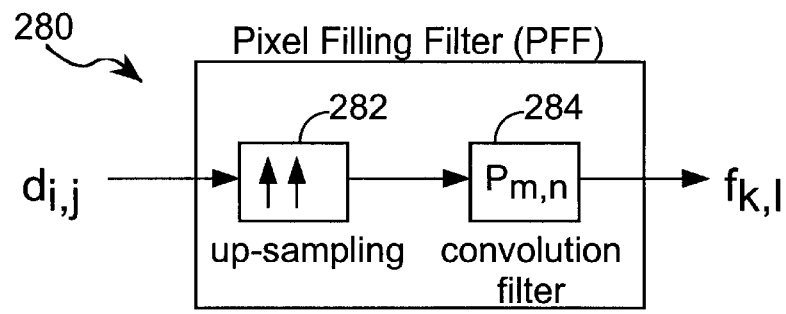
FIG. 9 is a block diagram of a pixel filling filter suitable for interpolating data points during image magnification.

Referring to FIG. 9, to magnifying an image, or a portion of an image, the image data is "up-sampled" by an "up-sampler" 282 and then a convolution filter 284 is applied to the up-sampled data. The combined operations are herein called a pixel filling filter (PFF). The up-sampler 282 generates additional data points, usually called pixels. For a two-dimensional image magnified by a factor of four (i.e., by a factor of two in each dimension), up-sampling doubles the number of pixels in each spatial dimension and increases the total number of pixels by a factor of four. The input to the up-sampling filter are a two-dimensional set of data values herein labeled $d_{i,j}$, the output of the up sampling filter is a set of data values labeled $d^\sim_{k,l}$ and the output of the PFF is a set of data values labeled $f_{k,l}$.

For odd values of k and/or odd values of l, $d^\sim_{k,l}$ is equal to 0, and for even values of both k and l, $$f_{k,l} = d^\sim_{k,l} = d_{\frac{k}{2},\frac{l}{2}}$$

for both k,l even

In other words, the original pixel data values at positions i,j are moved to positions 2i,2j, and all the "new" pixel data values are initially set to zero. Restated, $f_{2i,2j} = d_{i,j}$ for integer values of i and j that fall within the initial set of image data.

The PFF operates in accordance with the following filter formula:

$$f_{k,l} = \sum_{i,j} P_{k-2i,l-2j} d_{i,j}$$

where $P_{k-2i,l-2j}$ are the coefficients of the filter. Generally, only a very small number (generally no more than eighteen) of the filter coefficients $P_{k-2i,l-2j}$ have non-zero values, and further the positions of all the non-zero coefficients are relatively close to the fill-in pixel $f_{k,l}$. Furthermore, in preferred embodiments, the sum of the non-zero coefficients (other than $P_{0,0}$) for a lowpass filter implemented in this manner is always equal to one. For a highpass filter that is implemented as a PFF, the sum of the non-zero coefficients (other than $P_{0,0}$) will generally be equal to zero.

Generally, when both k and l are even numbered values, such as 0,0 or 2,4, the only non-zero coefficient in the PFF filter equation above will be the $P_{0,0}$ coefficient, which is always equal to 1. When either k or l or both are odd numbered values, the $P_{0,0}$ coefficient is not used in Equation 3, because either k−2i or l−2j cannot be equal to zero.

In a preferred embodiment, each non-zero $P_{k,l}$ coefficient is an integer divided by an integer power of two.

The set of interpolated $f_{k,l}$ values in conjunction with the $d_{i,j}$ values represent a smooth surface that is continuous, and that has a two-dimensional spatial first derivative that is continuous. Furthermore, the smooth surface represented by the set of interpolated $f_{k,l}$ values in conjunction with the $d_{i,j}$ values has at each of a plurality of locations (k,l) for which an interpolated value is generated a tangent plane that is substantially parallel to a plane formed by adjacent ones of the data points (k,l) corresponding to data values $d_{i,j}$. Whenever a local contiguous set of the initial data values $d_{i,j}$ all fall on a polynomial surface, the interpolated $f_{k,l}$ values that are located between the initial data points also fall on that same polynomial surface.

Figure 10A:
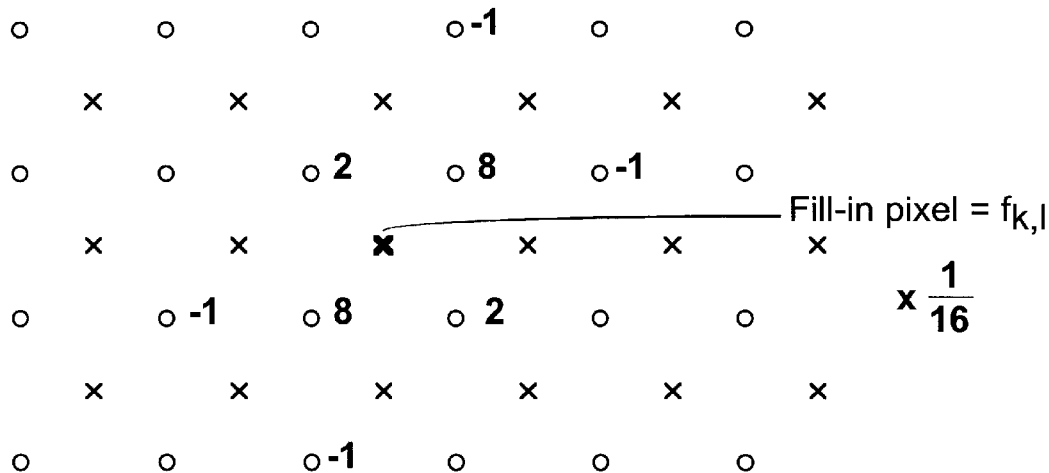
FIGS. 10A and 10B depict examples of lowpass and highpass filters suitable for use in conjunction with the pixel filling filter of FIG. 9 and FIG. 6A.
Figure 10B:
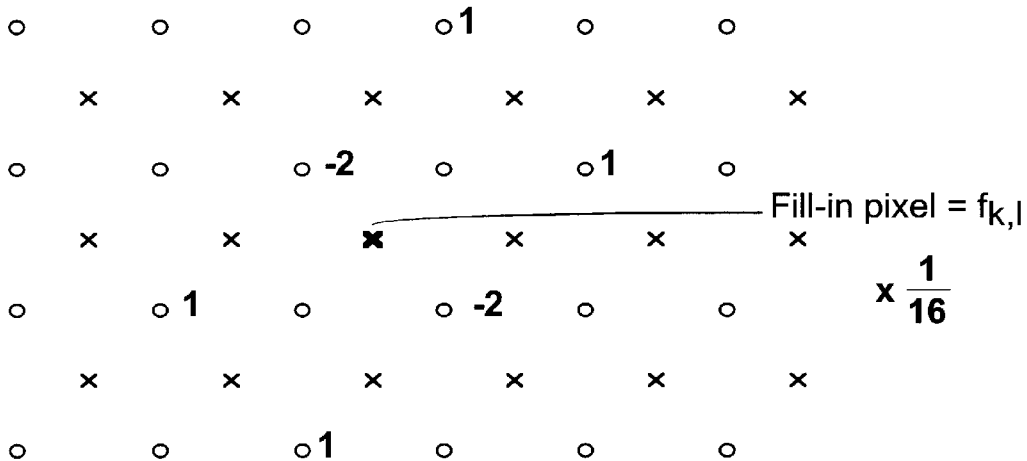
Figure 10C:
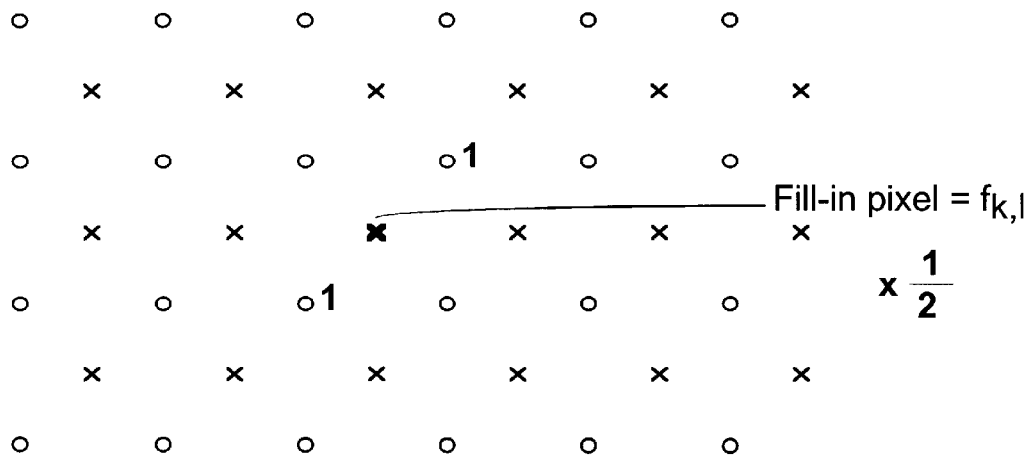
FIG. 10C depicts the sum of the lowpass and highpass filters shown in FIGS. 10A and 10B.

FIG. 10A shows the coefficients for a lowpass pixel filling filter suitable for use in the magnification filter 240 or 260 of FIGS. 8A and 8B, while FIG. 10B shows the coefficients for a highpass pixel filling filter suitable for use as $HP_1$, (242) in the magnification filter 220 of FIGS. 8A and 8B. FIG. 10C shows that the sum of the filter coefficients for the high and lowpass pixel filling filters in FIGS. 10A and 10B is the same as the lowpass filter for Barycentric linear interpolation.

An appropriate second highpass filter 246 for use in the magnification filters shown in FIGS. 8A and 8B would be a sharpening highpass filter having filter coefficients of (0.5, −0.5). Appropriate selection of the two sharpening parameters $0 \leq T \leq S \leq 1$ depends on the image which is being magnified. For simple implementations, to ease user selection of the appropriate sharpening parameters the image magnification application may allow the user to select only one of the parameter values, or one of a set of sharpness level indicators (e.g., ++, +, 0, −, −−), and then set the other sharpness parameter to a predefined corresponding value.

The filters whose coefficients are shown in FIGS. 10A and 10B would also be suitable for use in the magnification filter shown in FIG. 6A.

Digital Image "Retouching" Using Sharpening Magnification Filter

The image sharpening aspects of the present invention can be used in image processing applications, such as picture enlarging and filtering applications. For instance, when editing enlarged digital photographs, the sharpness enhancement (highpass) filter can be used (with adjustable sharpening parameters S and T, as shown in FIGS. 8A and 8B) to selected regions of interest, such as eyes, edges and other portions of the picture that cannot tolerate blurring. More specifically, the entire image would be initially magnified using the lowpass filter, and then selected regions of interest would be "retouched" by using one or more highpass filters to generate sharpening data (for the regions of interest) and then combining the enlarged image with the sharpening data using a weighted summing process (as described above).

Figure 11:
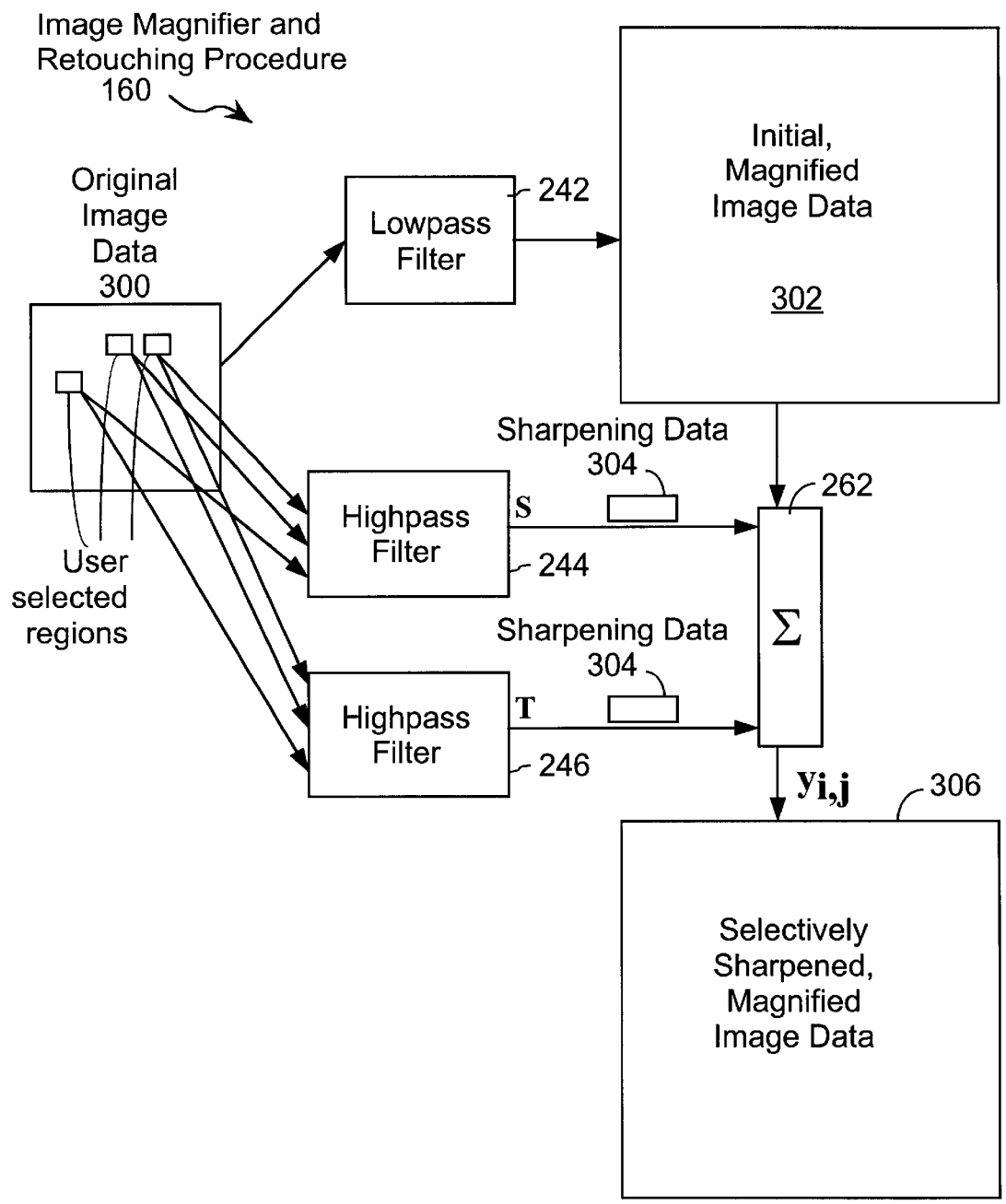
FIG. 11 depicts an image magnification and retouching process.

Referring to FIGS. 11 and 2, in a preferred embodiment, the image magnification and retouching procedure 160 works as follows. An initial image, represented by initial image data 300 is initially magnified using a lowpass filter 242 to generate an initial magnified image, represented by initial, magnified image data 302. The initial magnified image will have smooth pixel value transitions, since it was generated using only the lowpass filter 242. The user then inspects the magnified image, and uses the image region selector 162 (FIG. 2) to select regions of the magnified image 30 that would, in the user's opinion, look better if they were sharper. For instance, the user may select regions of the magnified image using a pointer device and a key or button to select rectangular, round or oval shaped regions for sharpening. If the image being magnified is a picture of a person, the eyes of the person would be a typical choice of a region to select for sharpening. Alternately, a software application might automatically select regions of the image to be sharpened based on a set of predefined selection criteria.

The corresponding regions of the initial image data are filtered by one or two highpass filters 244, 246 to generate sharpening data 304. The sharpening data 304 is weighted by a sharpening parameter S, or two sharpening parameters S and T when two highpass filters are used. In a preferred embodiment, the coefficients of the highpass filters 244, 246 are scaled by their respective sharpness parameters S and T. The values of the sharpening parameters may be selected by the user or an application using the sharpening parameter selector 163 (FIG. 2). The weighted sharpening data is then combined with the initial magnified image data 302, using an image data summer or adder 262 to generate a selectively sharpened, magnified image represented by image data 306. This last step may be performed under the control of a retouched image generator 164 (FIG. 2).

Alternate Embodiments

The present invention can be implemented as a computer program product that includes a computer program mechanism embedded in a computer readable storage medium. For instance, the computer program product could contain the program modules shown in FIG. 2. These program modules may be stored on a CD-ROM, magnetic disk storage product, or any other computer readable data or program storage product. The software modules in the computer program product may also be distributed electronically, via the Internet or otherwise, by transmission of a computer data signal (in which the software modules are embedded) on a carrier wave.

While in the preferred embodiments the sharpening parameters S and T have values in the range 0 to 1, in other embodiments the sharpening parameters might have a wider range of values (e.g., −4 to +4).

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

What is claimed is:

1. A computer implemented magnification filter for magnifying an image represented by initial image data, comprising:
   a lowpass filter,
   a first highpass filter, and
   an adder that generates a sum of filtered image data generated by the lowpass and highpass filters, wherein the generated sum of filtered image data represents a magnified image that is magnified with respect to the image represented by the initial image data;
   the magnification filter further including a second highpass filter;

wherein
   the first highpass filter has filter coefficients weighted by a first sharpness parameter S, and the second highpass filter has filter coefficients weighted by a second sharpness parameter T; and
   the adder generates a sum of image data generated by the lowpass and first and second highpass filters.

2. The magnification filter of claim 1, wherein S is a value between 0 and 1, and T is a value between 0 and 1.

3. The magnification filter of claim 1, wherein the lowpass and first highpass filters are both wavelet like convolution filters, wherein the lowpass filter has coefficients whose sum is equal to 1, and the first highpass filter has coefficients whose sum is equal to zero.

4. The magnification filter of claim 1, wherein the first and second sharpness parameters are assigned values in accordance with a user command.

5. The magnification filter of claim 1,
   wherein the lowpass filter generates an interpolated value for each of a plurality of initially undefined $f_{k,l}$ values in accordance with the filter equation:

$$f_{k,l} = \sum_{i,j} P_{k-2ni,l-2nj} d_{i,j}$$

wherein
   n is a positive integer;
   $d_{i,j}$ are the subset of $f_{k,l}$ values which have defined values prior to the generation of the interpolated $f_{k,l}$ values, such that ion=,i for integer values of i and j that fall within the initial set of image data;
   $P_{k,l}$ are coefficients, no more than eighteen of which have non-zero values; and
   each non-zero $P_{k,l}$ coefficient is an integer divided by an integer power of two.

6. The magnification filter of claim 5, wherein the set of interpolated $f_{k,l}$ values in conjunction with the $d_{i,j}$ values represent a smooth surface that is continuous, and that has a two-dimensional spatial first derivative that is continuous.

7. The magnification filter of claim 8, wherein the smooth surface represented by the set of interpolated $f_{k,l}$ values in conjunction with the $d_{i,j}$ values has at each of a plurality of locations (k,l) for which an interpolated value is generated a tangent plane that is substantially parallel to a plane formed by adjacent ones of the data points (k,l) corresponding to data values $d_{i,j}$.

8. The magnification filter of claim 7, wherein
   whenever a local contiguous set of the initial data values $d_{i,j}$ all fall on a polynomial surface, the interpolated $f_{k,l}$ values that are located between the initial data points also fall on that same polynomial surface.

9. The magnification filter of claim 6, wherein the non-zero $p_{k,l}$ coefficients, when summed, have an associated sum equal to 1.

10. A computer program product for use in conjunction with a computer system having a display device for displaying an image corresponding to initial image data stored in a buffer, the computer program product comprising a computer readable storage medium and a computer program mechanism embedded therein, the computer program mechanism comprising:
   an image magnification module that includes:
      a lowpass filter,
      a first highpass filter, and
      an adder that generates a sum of filtered image data generated by the lowpass and highpass filters, wherein the generated sum of filtered image data represents a magnified image that is magnified with respect to the image represented by the initial image data.

the magnification filter further including a second highpass filter;

wherein the first highpass filter has filter coefficients weighted by a first sharpness parameter S, and the second highpass filter has filter coefficients weighted by a second sharpness parameter T; and the adder generates a sum of image data generated by the lowpass and first and second highpass filters.

11. The computer program product of claim 10, wherein the highpass filter is a first highpass filter;

the magnification filter further including a second highpass filter;

wherein the first highpass filter has filter coefficients weighted by a first sharpness parameter S, where S is a value between 0 and 1, and the second highpass filter has filter coefficients weighted by a second sharpness parameter T, where T is a value between 0 and 1; and the adder generates a sum of image data generated by the lowpass and first and second highpass filters.

12. The computer program product of claim 11, wherein the lowpass and first highpass filters are both wavelet like convolution filters, wherein the lowpass filter has coefficients whose sum is equal to 1, and the first highpass filter has coefficients whose sum is equal to zero.

13. The computer program product of claim 11, wherein the first and second sharpness parameters are assigned values in accordance with a user command.

14. The computer program product of claim 10, wherein the lowpass filter generates an interpolated value for each of a plurality of initially undefined $f_{k,l}$ values in accordance with the filter equation:

$$f_{k,l} = \sum_{i,j} P_{k-2ni, l-2nj} d_{i,j}$$

wherein is a positive integer;

$d_{i,j}$ are the subset of $f_{k,l}$ 1 values which have defined values prior to the generation of the interpolated $f_{k,l}$ values, such that $f_{2ni,2nj}=d_{i,j}$ for integer values of i and j that fall within the initial set of image data;

$P_{k,l}$ are coefficients, no more than eighteen of which have non-zero values; and each non-zero $P_{k,l}$ coefficient is an integer divided by an integer power of two.

15. The computer program product of claim 14, wherein the set of interpolated $f_{k,l}$ values in conjunction with the $d_{k,l}$ values represent a smooth surface that is continuous, and that has a two-dimensional spatial first derivative that is continuous.

16. The computer program product of claim 15, wherein the smooth surface represented by the set of interpolated $f_{k,l}$ values in conjunction with the $d_{i,j}$ values has at each of a plurality of locations (k,l) for which an interpolated value is generated a tangent plane that is substantially parallel to a plane formed by adjacent ones of the data points (k,l) corresponding to data values $d_{i,j}$.

17. The computer program product of claim 16, wherein whenever a local contiguous set of the initial data values $d_{i,j}$ all fall on a polynomial surface, the interpolated $f_{k,l}$ values that are located between the initial data points also fall on that same polynomial surface.

18. The computer program product of claim 16, wherein the non-zero $P_{k,l}$ coefficients, when summed, have an associated sum equal to 1.

19. A computer implemented method of magnifying an image represented by initial image data, comprising:

up-sampling the initial image data;

lowpass filtering the up-sampled image data to generate first image data representing a magnified image;

highpass filtering the up-sampled image data to generate second image data; and generating a sum of the first and second image data, wherein the generated sum of filtered image data represents a magnified image that is magnified with respect to the image represented by the initial image data.

wherein the highpass filtering includes filtering the up-sampled image data with both a first highpass filter and a second highpass filter;

the first highpass filter has filter coefficients weighted by a first sharpness parameter S, and the second highpass filter has filter coefficients weighted by a second sharpness parameter T; and the generating generates a sum of image data generated by the lowpass and first and second highpass filters.

20. The method of claim 19, wherein the highpass filtering step includes filtering the up-sampled image data with both a first highpass filter and a second highpass filter;

the first highpass filter has filter coefficients weighted by a first sharpness parameter S, where S is a value between 0 and 1, and the second highpass filter has filter coefficients weighted by a second sharpness parameter T, where T is a value between 0 and 1; and the generating step generates a sum of image data generated by the lowpass and first and second highpass filters.

21. The method of claim 19, wherein the lowpass filter step is performed using a lowpass filter;

the lowpass and first highpass filters are both wavelet like convolution filters, wherein the lowpass filter has coefficients whose sum is equal to 1, and the first highpass filter has coefficients whose sum is equal to zero.

22. The method of claim 19, wherein the first and second sharpness parameters are assigned values in accordance with a user command.

23. The method of claim 19, wherein the lowpass filtering step generates an interpolated value for each of a plurality of initially undefined $f_{k,l}$ values in accordance with the filter equation:

$$f_{k,l} = \sum_{i,j} P_{k-2ni, l-2nj} d_{i,j}$$

wherein n is a positive integer;

$d_{i,j}$ are the subset of $f_{k,l}$ values which have defined values prior to the generation of the interpolated $f_{k,l}$ values, such that $f_{2ni,2nj}=d_{i,j}$ for integer values of i and j that fall within the initial set of image data;

$P_{k,l}$ are coefficients, no more than eighteen of which have non-zero values; and each non-zero $P_{k,l}$ coefficient is an integer divided by an integer power of two.

24. The method of claim 23, wherein the set of interpolated $f_{k,l}$ values in conjunction with the $d_{i,j}$ values represent a smooth surface that is continuous, and that has a two-dimensional spatial first derivative that is continuous.

25. The method of claim 24, wherein the smooth surface represented by the set of interpolated $f_{k,l}$ values in conjunction with the $d_{i,j}$ values has at each of a plurality of locations (k,l) for which an interpolated value is generated a tangent plane that is substantially parallel to a plane formed by adjacent ones of the data points (k,l) corresponding to data values $d_{i,j}$.

26. The method of claim 25, wherein
whenever a local contiguous set of the initial data values $d_{i,j}$ all fall on a polynomial surface, the interpolated $f_{k,l}$ values that are located between the initial data points also fall on that same polynomial surface.

27. The method of claim 26, wherein the non-zero $p_{k,l}$ coefficients, when summed, have an associated sum equal to 1.

28. A computer implemented method of magnifying an image represented by initial image data, comprising:
magnifying the image, using a lowpass filter to lowpass filter the initial image data so as to generate initial magnified image data;
selecting one or more regions of the image for sharpening;
highpass filtering portions of the initial image data corresponding to the selected regions with a highpass filter to generate sharpening data, and
forming a sum of the initial magnified image data and the sharpening data so as to generate selectively sharpened, magnified image data representing a retouched magnified image that is magnified with respect to the image represented by the initial image data;
wherein
the highpass filtering step includes filtering the initial image data with both a first highpass filter and a second highpass filter;
the first highpass filter has filter coefficients weighted by a first sharpness parameter S, and the second highpass filter has filter coefficients weighted by a second sharpness parameter T; and
forming a sum step generates a sum of image data generated by the lowpass and first and second highpass filters.

29. The method of claim 28, wherein
the highpass filtering step includes filtering the initial image data with both a first highpass filter and a second highpass filter;
the first highpass filter has filter coefficients weighted by a first sharpness parameter S, where S is a value between 0 and 1, and the second highpass filter has filter coefficients weighted by a second sharpness parameter T, where T is a value between 0 and 1; and
forming a sum step generates a sum of image data generated by the lowpass and first and second highpass filters.

30. The method of claim 28, wherein
the lowpass filter step is performed using a lowpass filter;
the lowpass and first highpass filters are both wavelet like convolution filters, wherein the lowpass filter has coefficients whose sum is equal to 1, and the first highpass filter has coefficients whose sum is equal to zero.

31. The method of claim 28, wherein the lowpass filtering step generates an interpolated value for each of a plurality of initially undefined $f_{k,l}$ values in accordance with the filter equation:

$$f_{k,l} = \sum_{i,j} P_{k-2ni,l-2nj} d_{i,j}$$

wherein
n is a positive integer;
$d_{i,j}$ are the subset of $f_{k,l}$ values which have defined values prior to the generation of the interpolated $f_{k,l}$ values, such that $f_{2ni,2nj} = d_{i,j}$ for integer values of i and j that fall within the initial set of image data;
$P_{k,l}$ are coefficients, no more than eighteen of which have non-zero values; and
each non-zero $P_{k,l}$ coefficient is an integer divided by an integer power of two.

32. The method of claim 31, wherein the set of interpolated $f_{k,l}$ values in conjunction with the $d_{i,j}$ values represent a smooth surface that is continuous, and that has a two-dimensional spatial first derivative that is continuous.

33. The method of claim 32, wherein the smooth surface represented by the set of interpolated $f_{k,l}$ values in conjunction with the $d_{i,j}$ values has at each of a plurality of locations (k,l) for which an interpolated value is generated a tangent plane that is substantially parallel to a plane formed by adjacent ones of the data points (k,l) corresponding to data values $d_{i,j}$.

34. The method of claim 33, wherein
whenever a local contiguous set of the initial data values $d_{i,j}$ all fall on a polynomial surface, the interpolated $f_{k,l}$ values that are located between the initial data points also fall on that same polynomial surface.

35. A computer program product for use in conjunction with a computer system having a display device for displaying an image corresponding to image data stored in a buffer, the computer program product comprising a computer readable storage medium and a computer program mechanism embedded therein, the computer program mechanism comprising:
an image magnification module that includes:
an initial magnification filter, including a lowpass filter, for lowpass filtering a specified set of image data so as to generate initial magnified image data;
means for selecting one or more regions of the image for sharpening;
a highpass filter for highpass filtering portions of the specified image data corresponding to the selected regions so as to generate sharpening data, and
a sharpened image generator that generates a sum of the initial magnified image data and the sharpening data so as to generate selectively sharpened, magnified image data representing a retouched magnified image that is magnified with respect to the image represented by the specified image data;
wherein the highpass filter is a first highpass filter;
the computer program product further includes a second highpass filter;
the first highpass filter has filter coefficients weighted by a first sharpness parameter S, and the second highpass filter has filter coefficients weighted by a second sharpness parameter T; and
the sharpened image generator generates a sum of image data generated by the lowpass and first and second highpass filters.

36. The computer program product of claim 35, wherein the first sharpness parameter S is a value between 0 and 1, and the second sharpness parameter T is a value between 0 and 1.

37. The computer program product of claim 35, wherein the lowpass and highpass filters are both wavelet like convolution filters, wherein the lowpass filter has coefficients whose sum is equal to 1, and the highpass filter has coefficients whose sum is equal to zero.

38. The computer program product of claim 35 wherein the lowpass filter generates an interpolated value for each of a plurality of initially undefined $f_{k,l}$ values in accordance with the filter equation:

$$f_{k,l} = \sum_{i,j} P_{k-2ni,l-2nj} d_{i,j}$$

wherein
- n is a positive integer;
- $d_{i,j}$ are the subset of $f_{k,l}$ values which have defined values prior to the generation of the interpolated $f_{k,l}$ values, such that $f_{2ni,2nj} = d_{i,j}$ for integer values of i and j that fall within the initial set of image data;
- $P_{k,l}$ are coefficients, no more than eighteen of which have non-zero values; and
- each non-zero $P_{k,l}$ coefficient is an integer divided by an integer power of two.

39. The computer program product of claim 38, wherein the set of interpolated $f_{k,l}$ values in conjunction with the $d_{i,j}$ values represent a smooth surface that is continuous, and that has a two-dimensional spatial first derivative that is continuous.

40. The computer program product of claim 39, wherein the smooth surface represented by the set of interpolated $f_{k,l}$ values in conjunction with the $d_{i,j}$ values has at each of a plurality of locations (k,l) for which an interpolated value is generated a tangent plane that is substantially parallel to a plane formed by adjacent ones of the data points (k,l) corresponding to data values $d_{i,j}$.

41. The computer program product of claim 40, wherein whenever a local contiguous set of the initial data values $d_{i,j}$ all fall on a polynomial surface, the interpolated $f_{k,l}$ values that are located between the initial data points also fall on that same polynomial surface.

42. The computer program product of claim 36, wherein the first and second sharpness parameters are assigned values in accordance with a user command.

* * * * *